United States Patent
Hsiao et al.

(10) Patent No.: US 8,543,059 B2
(45) Date of Patent: Sep. 24, 2013

(54) COMBO WIRELESS SYSTEM AND METHOD USING THE SAME

(75) Inventors: Kun Yuan Hsiao, Hsinchu County (TW); Hsin Yin Lee, Hsinchu County (TW)

(73) Assignee: Ralink Technology Corporation, Jhubei, Hsinchu County (TW)

(*) Notice: Subject to any disclaimer, the term of this patent is extended or adjusted under 35 U.S.C. 154(b) by 435 days.

(21) Appl. No.: 12/785,977

(22) Filed: May 24, 2010

(65) Prior Publication Data

US 2011/0105026 A1    May 5, 2011

Related U.S. Application Data

(60) Provisional application No. 61/255,877, filed on Oct. 29, 2009.

(51) Int. Cl.
*H04B 7/00* (2006.01)

(52) U.S. Cl.
USPC .......................... 455/41.2; 455/41.1; 455/78

(58) Field of Classification Search
USPC ............ 455/41.1, 41.2, 78, 82, 84, 132, 137, 455/138, 141
See application file for complete search history.

(56) References Cited

U.S. PATENT DOCUMENTS

| | | | |
|---|---|---|---|
| 8,155,612 B1 * | 4/2012 | Husted et al. | 455/234.1 |
| 2004/0204037 A1 * | 10/2004 | He et al. | 455/553.1 |
| 2009/0262042 A1 | 10/2009 | Li et al. | |
| 2009/0264086 A1 * | 10/2009 | Song et al. | 455/90.2 |

FOREIGN PATENT DOCUMENTS

CN    201199687    2/2009

* cited by examiner

*Primary Examiner* — Tuan H Nguyen
(74) *Attorney, Agent, or Firm* — Hamre, Schumann, Mueller & Larson, P.C.

(57) ABSTRACT

A combo wireless system comprises a Bluetooth module, a wireless fidelity (WiFi) module, a single pole triple throw (SP3T) switch and an antenna. The antenna is utilized to transmit/receive Bluetooth signals for the Bluetooth module and to transmit/receive WiFi signals for the WiFi module. The SP3T switch is coupled between the antenna, the Bluetooth module and the WiFi module. The SP3T switch is controlled to select a path for the Bluetooth module to transmit/receive Bluetooth signals through the antenna, to select another path for the WiFi module to transmit WiFi signals through the antenna or to select another path for the WiFi module to receive the WiFi signals through the antenna.

6 Claims, 10 Drawing Sheets

COMBO WIRELESS SYSTEM AND METHOD USING THE SAME

BACKGROUND OF THE INVENTION

1. Field of the Invention

The present invention relates to a communication system, and more particularly, to a combo wireless system and method using the same.

2. Description of the Related Art

Wireless technology is widely used nowadays. A user can receive or send data to and from a portable device, such as a mobile phone, a personal digital assistant (PDA) or a notebook computer, to or from another portable device or a stationary device via wireless communication. Different standards have been established to govern these communications. Wireless fidelity (WiFi) and Bluetooth (BT) are the most common standards used in portable devices. The IEEE 802.11 standard defines the transmission in a wireless local area network (WLAN), while Bluetooth is usually used for point-to-point transmission within a short distance. A new standard, Bluetooth 3.0 (BT 3.0), is also proposed for a combination device that integrates WLAN and Bluetooth transmission functions into a single device. The combination device is capable of transceiving signals through both WLAN and Bluetooth channels.

A combo chipset that integrates the WiFi and BT transmission functions has been recently proposed. During operation, the combo chipset is capable of transmitting signals through the WLAN channel or the BT channel. However, in a conventional wireless communication system with a combo chipset, a BT module and a WiFi module use different antennas. Therefore, the corresponding circuitry is complicated. Moreover, even with two antennas being used for the combo chipset, neither the WiFi module nor the BT module can obtain the benefit of antenna diversity. Therefore, there is a need for a circuit to efficiently operate antenna(s) for the combo device.

SUMMARY OF THE INVENTION

One aspect of the present disclosure discloses a combo wireless system, comprising at least one communication antenna, a first wireless module, a second wireless module and at least one switch. The communication antenna is utilized to transmit/receive a first type of signal for the first wireless module and to transmit/receive a second type of signal for the second wireless module. The switch is coupled between the communication antenna, the first wireless module and the second wireless module.

Another aspect of the disclosure discloses a method for using a combo wireless system comprising steps of: performing a path selecting procedure for a first wireless module to transmit/receive a first type of signal or for a second wireless module to transmit/receive a second type of signal; and performing a transmitting/receiving procedure for the first wireless module to transmit/receive the first type of signal or for the second wireless module to transmit/receive the second type of signal.

BRIEF DESCRIPTION OF THE DRAWINGS

The accompanying drawings illustrate several embodiments of the invention and, together with the description, serve to explain the principles of the invention. Those skilled in the art will recognize that the particular embodiments illustrated in the drawings are merely exemplary, and are not intended to limit the scope of the present invention.

PREFERRED EMBODIMENT OF THE PRESENT INVENTION

Figure 1:
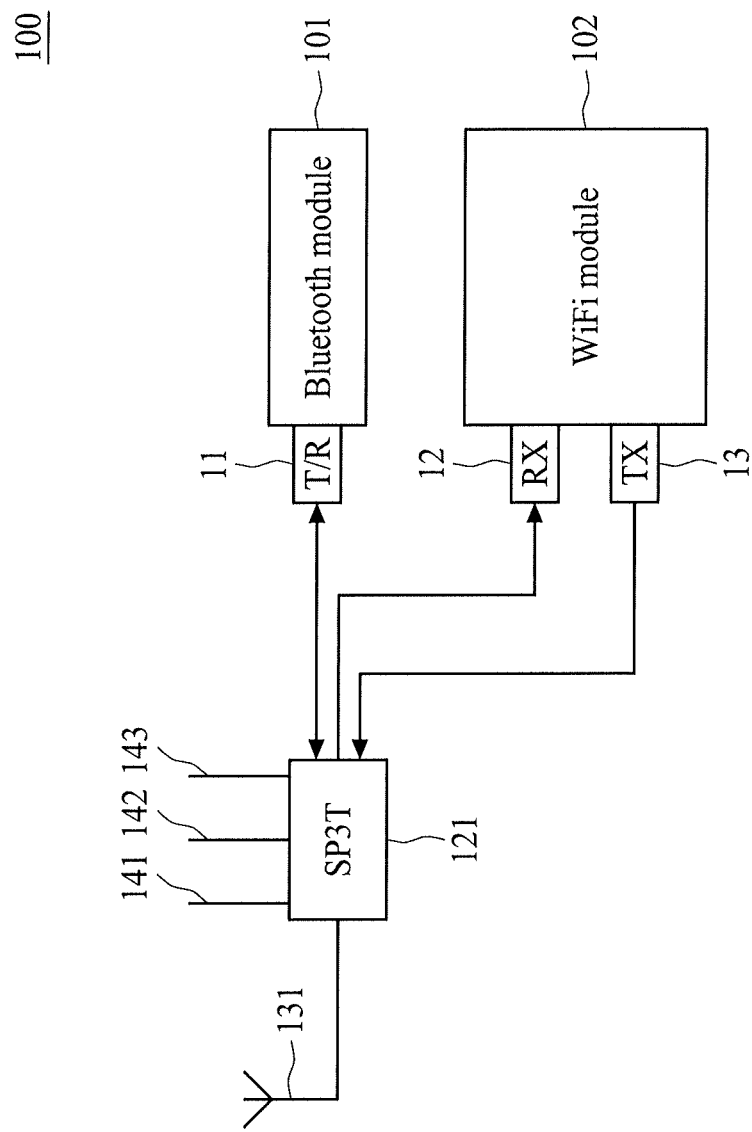
FIG. 1 shows a block diagram of a combo wireless system in accordance with an exemplary embodiment of the present disclosure.

FIG. 1 is a block diagram of a combo wireless system in accordance with an exemplary embodiment of the present disclosure. The combo wireless system 100 comprises a Bluetooth module 101, a WiFi module 102, a single pole triple throw (SP3T) switch 121 and an antenna 131. In accordance with an exemplary embodiment, the Bluetooth module 101 and the WiFi module 102 are one transmission one receiving (1T1R) modules. The antenna 131 is utilized to transmit/receive Bluetooth signals for the Bluetooth module 101 and to transmit/receive WiFi signals for the WiFi module 102. The SP3T switch 121 is coupled between the antenna 131, the Bluetooth module 101 and the WiFi module 102. The SP3T switch 121 is controlled by control lines 141, 142 and 143 to select a signal path for a transmitting/receiving (T/R) port 11 of the Bluetooth module 101 to transmit/receive Bluetooth signals through the antenna 131, to select another signal path for a receiving (RX) port 12 of the WiFi module to receive WiFi signals through the antenna 131 or to select yet another signal path for a transmitting port (TX) 13 of the WiFi module 102 to transmit WiFi signals through the antenna 131. In other words, according to the signals given to the SP3T switch 121 via the control lines 141-143, the SP3T switch 121 couples the antenna 131 to either the T/R port 11, the RX port 12 or the TX port 13. Since only one module is active at a time, the interference between the Bluetooth module 101 and the WiFi module 102 can be reduced, and hence good isolation between the Bluetooth module 101 and the WiFi module 102 is achieved. The WiFi module 102 is used as an example, and can be replaced with other wireless modules, such as a 3G module, a Worldwide Interoperability for Microwave Access (WiMAX) module or an Ultra-Wideband (UWB) module.

The above-mentioned WiFi signals can also be 3G signals, WiMAX signals or UWB signals.

Figure 2:
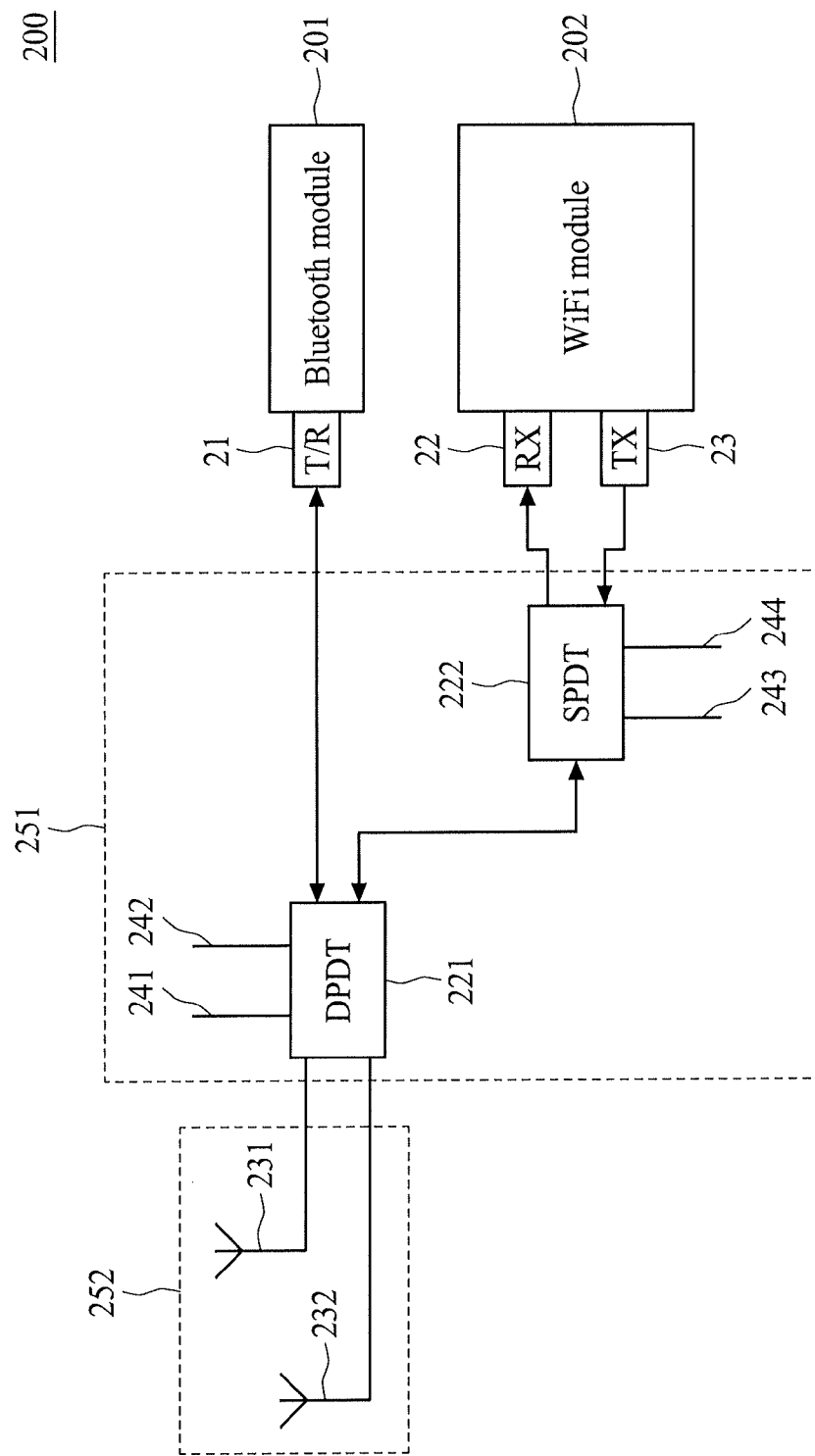
FIG. 2 shows a block diagram of a combo wireless system in accordance with another exemplary embodiment of the present disclosure.

FIG. 2 is a block diagram of a combo wireless system in accordance with another exemplary embodiment of the present disclosure. The combo wireless system 200 comprises a Bluetooth module 201, a WiFi module 202, a switch 251 and a communication antenna 252. The switch 251 comprises a dual pole dual throw (DPDT) switch 221 and a single pole dual throw (SPDT) switch 222. The communication antenna 252 comprises antennas 231 and 232. In accordance with an exemplary embodiment, the Bluetooth module 201 and the WiFi module 202 are 1T1R modules. The antenna 231 and the antenna 232 are utilized to transmit/receive Bluetooth signals for the Bluetooth module 201, and to transmit/receive WiFi signals for the WiFi module 202. The DPDT switch 221 is coupled between the antenna 231, the antenna 232, the Bluetooth module 201 and the SPDT switch 222. The SPDT switch 222 is coupled between the DPDT switch 221 and the WiFi module 202. The DPDT switch 221 is controlled by a control line 241 and a control line 242 to select a signal path for a transmitting/receiving (T/R) port 21 of the Bluetooth module 201 to transmit/receive Bluetooth signals through either the antenna 231 or the antenna 232, and to select the other signal path for the WiFi module 202 to transmit/receive WiFi signals through the SPDT switch 222 and the other antenna 231 or antenna 232, i.e., the antenna 231 or the antenna 232 which is not coupled to the Bluetooth module 201. The SPDT switch 222 is controlled by a control line 243 and a control line 244 to select a signal path for an RX port 22 of the WiFi module 202 to receive WiFi signals through the DPDT switch 221 and through the antenna 231 or the antenna 232 which is coupled to the SPDT switch 222, or to select another path for a TX port 23 of the WiFi module 202 to transmit WiFi signals through the DPDT switch 221 and through the antenna 231 or the antenna 232 which is coupled to the SPDT switch 222. In accordance with an exemplary embodiment, during operation of the combo wireless system 200, if the WiFi module 202 has a higher priority, the DPDT switch 221 is controlled to couple the antenna (for example, the antenna 231) with better reception to the SPDT switch 222 for the WiFi module 202 to transmit/receive WiFi signals, and to couple the antenna 232 to the Bluetooth module 201. Therefore, the WiFi module 202 can achieve antenna diversity. The WiFi module 202 is used as an example, and can be replaced with other wireless modules, such as a 3G module, a WiMAX module or a UWB module. The above-mentioned WiFi signals can also be 3G signals, WiMAX signals or UWB signals. Moreover, the connections between the switches and the wireless modules can be changed. For example, the transmitting/receiving (T/R) port 21 of the Bluetooth module 201 can be coupled to one terminal of the SPDT 222, while one of the RX port 22 or the TX port 23 of the WiFi module 202 is coupled to the other terminal of the SPDT 222, and the other port of the WiFi module 202 is coupled to the DPDT 221.

Figure 3:
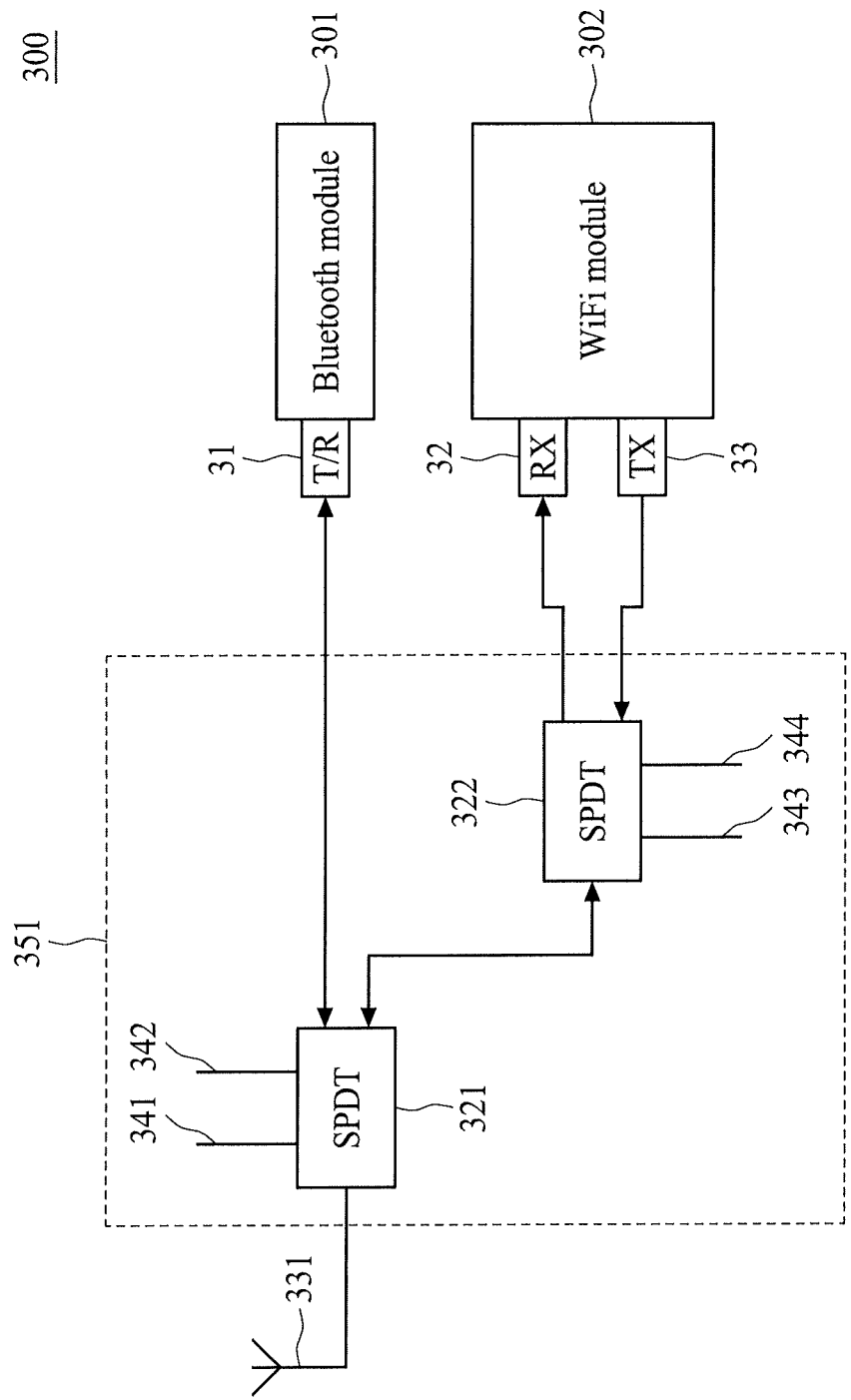
FIG. 3 shows a block diagram of a combo wireless system in accordance with another exemplary embodiment of the present disclosure.

FIG. 3 is a block diagram of a combo wireless system in accordance with another exemplary embodiment of the present disclosure. The combo wireless system 300 comprises a Bluetooth module 301, a WiFi module 302, a switch 351 and an antenna 331. The switch 351 comprises an SPDT switch 321 and an SPDT switch 322. In accordance with an exemplary embodiment, the Bluetooth module 301 and the WiFi module 302 are 1T1R modules. The antenna 331 is utilized to transmit/receive Bluetooth signals for the Bluetooth module 301, and to transmit/receive WiFi signals for the WiFi module 302. The SPDT switch 321 is coupled between the antenna 331, the Bluetooth module 301 and the SPDT switch 322. The SPDT switch 322 is coupled between the SPDT switch 321 and the WiFi module 302. The SPDT switch 321 is controlled by a control line 341 and a control line 342 to select a signal path for a transmitting/receiving (T/R) port 31 of the Bluetooth module 301 to transmit/receive Bluetooth signals through the antenna 331, and to select another signal path for the WiFi module 302 to transmit/receive WiFi signals through the SPDT switch 322 and the antenna 331. The SPDT switch 322 is controlled by a control line 343 and a control line 344 to select a signal path for an RX port 32 of the WiFi module 302 to receive WiFi signals through the SPDT switch 321 and the antenna 331, or to select another path for a TX port 33 of the WiFi module 302 to transmit WiFi signals through the SPDT switch 321 and the antenna 331. In accordance with an exemplary embodiment, during operation of the combo wireless system 300, if the WiFi module 302 has a higher priority, the SPDT switch 321 is controlled to couple the antenna 331 to the SPDT switch 322 for the WiFi module 302 to transmit/receive WiFi signals. The WiFi module 302 is used as an example, and can be replaced with other wireless modules, such as a 3G module, a WiMAX module or a UWB module. The above-mentioned WiFi signals can also be 3G signals, WiMAX signals or UWB signals. Moreover, the connections between the switches and the wireless modules can be changed. For example, the transmitting/receiving (T/R) port 31 of the Bluetooth module 301 can be coupled to one terminal of the SPDT 322, while one of the RX port 32 or the TX port 33 of the WiFi module 302 is coupled to the other terminal of the SPDT 322, and the other port of the WiFi module 302 is coupled to the SPDT 321.

Figure 4:
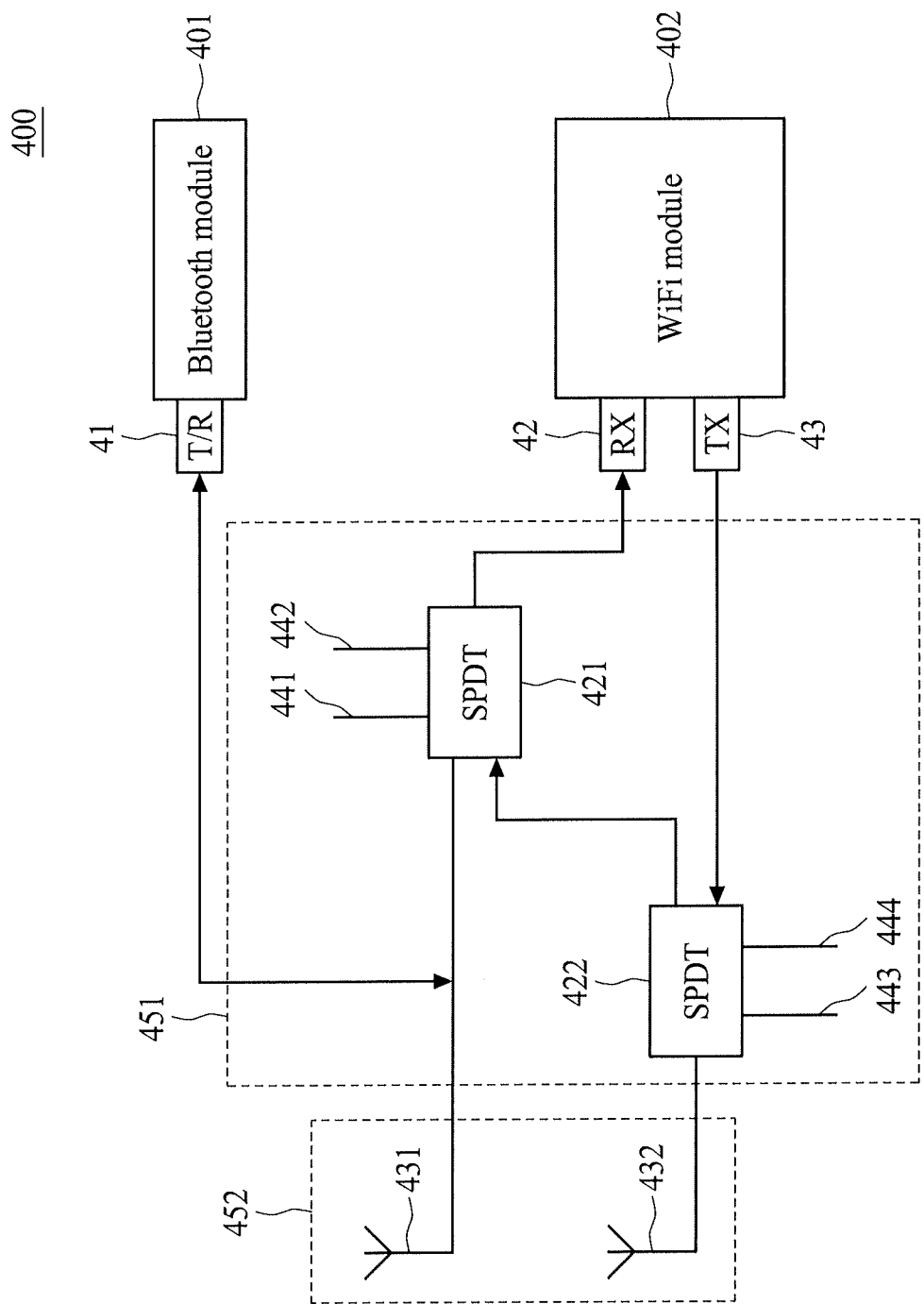
FIG. 4 shows a block diagram of a combo wireless system in accordance with another exemplary embodiment of the present disclosure.

FIG. 4 is a block diagram of a combo wireless system in accordance with another exemplary embodiment of the present disclosure. The combo wireless system 400 comprises a Bluetooth module 401, a WiFi module 402, a switch 451 and a communication antenna 452. The switch 451 comprises an SPDT switch 421 and an SPDT switch 422. The communication antenna 452 comprises an antenna 431 and an antenna 432. In accordance with an exemplary embodiment, the Bluetooth module 401 and the WiFi module 402 are 1T1R modules. The antenna 431 is utilized to transmit/receive Bluetooth signals for the Bluetooth module 401 and to receive WiFi signals for the WiFi module 402. The antenna 432 is utilized to transmit/receive WiFi signals for the WiFi module 402. The SPDT switch 421 is coupled between the antenna 431, the SPDT switch 422 and the WiFi module 402. The SPDT switch 422 is coupled between the antenna 432, the SPDT switch 421 and the WiFi module 402. The SPDT switch 421 is controlled by a control line 441 and a control line 442 to select a signal path for an RX port 42 of the WiFi module 402 to receive WiFi signals through the antenna 431, or to select another signal path for the RX port 42 of the WiFi module 402 to receive WiFi signals through the SPDT switch 422 and the antenna 432. The SPDT switch 422 is controlled by a control line 443 and a control line 444 to select a signal path for the RX port 42 of the WiFi module 402 to receive WiFi signals through the SPDT switch 421 and the antenna 432, or to select another path for a TX port 43 of the WiFi module 402 to transmit WiFi signals through the antenna 432. In this embodiment, either the antenna 431 or the antenna 432 can be selected for the RX port 42 of the WiFi module 402 to receive WiFi signals. During the period of receiving signals, the WiFi module 402 can achieve antenna diversity. The WiFi module 402 is used as an example, and can be replaced with any other wireless modules, such as a 3G module, a WiMAX module or a UWB module. The above-mentioned WiFi signals can also be 3G signals, WiMAX signals or UWB signals.

Figure 5:
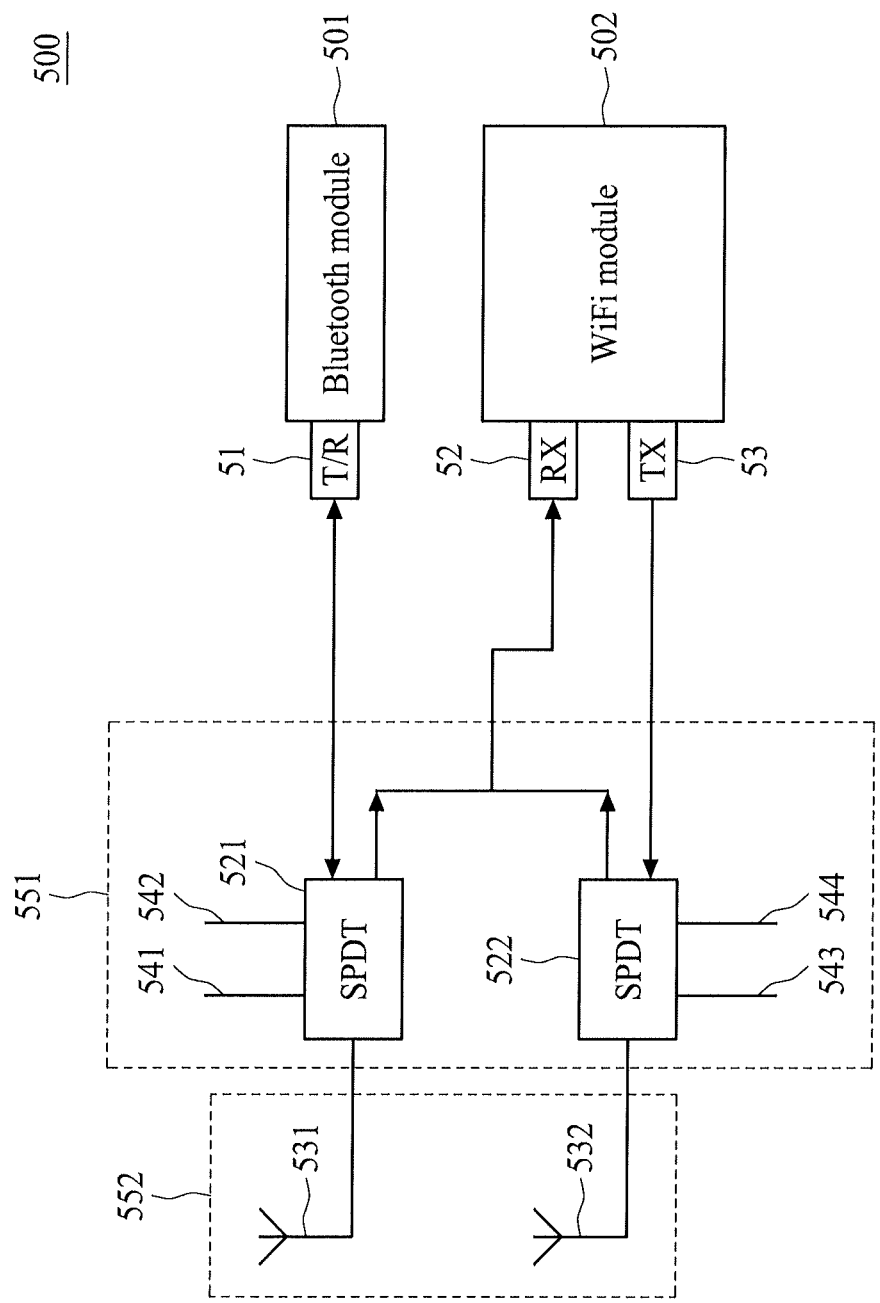
FIG. 5 shows a block diagram of a combo wireless system in accordance with another exemplary embodiment of the present disclosure.

FIG. 5 is a block diagram of a combo wireless system in accordance with another exemplary embodiment of the present disclosure. The combo wireless system 500 comprises a Bluetooth module 501, a WiFi module 502, a switch 551 and a communication antenna 552. The switch 551 comprises an SPDT switch 521 and an SPDT switch 522. The communication antenna 552 comprises an antenna 531 and an antenna 532. In accordance with an exemplary embodiment, the Bluetooth module 501 and the WiFi module 502 are 1T1R modules. The antenna 531 is utilized to receive Bluetooth signals for the Bluetooth module 501 and to transmit/receive WiFi signals for the WiFi module 502. The antenna 532 is utilized to transmit/receive WiFi signals for the WiFi module 502. The SPDT switch 521 is coupled between the antenna 531, the Bluetooth module 501 and the WiFi module 502. The SPDT switch 522 is coupled between the antenna 532 and the WiFi module 502. The SPDT switch 521 is controlled by a control line 541 and a control line 542 to select a signal path for the Bluetooth module 501 to transmit/receive Bluetooth signals through the antenna 531, or to select another signal path for an RX port 52 of the WiFi module 502 to receive WiFi signals through the antenna 531. The SPDT switch 522 is controlled by a control line 543 and a control line 544 to select a signal path for the RX port 52 of the WiFi module 502 to receive WiFi signals through the antenna 532, or to select another path for a TX port 53 of the WiFi module 502 to transmit WiFi signals through the antenna 532. In this embodiment, either the antenna 531 or the antenna 532 can be selected for the RX port 52 of the WiFi module 502 to receive WiFi signals. During the period of receiving signals, the WiFi module 502 can achieve antenna diversity. The WiFi module 502 is used as an example, and can be replaced with other wireless modules, such as a 3G module, a WiMAX module or a UWB module. The above-mentioned WiFi signals can also be 3G signals, WiMAX signals or UWB signals.

Figure 6:
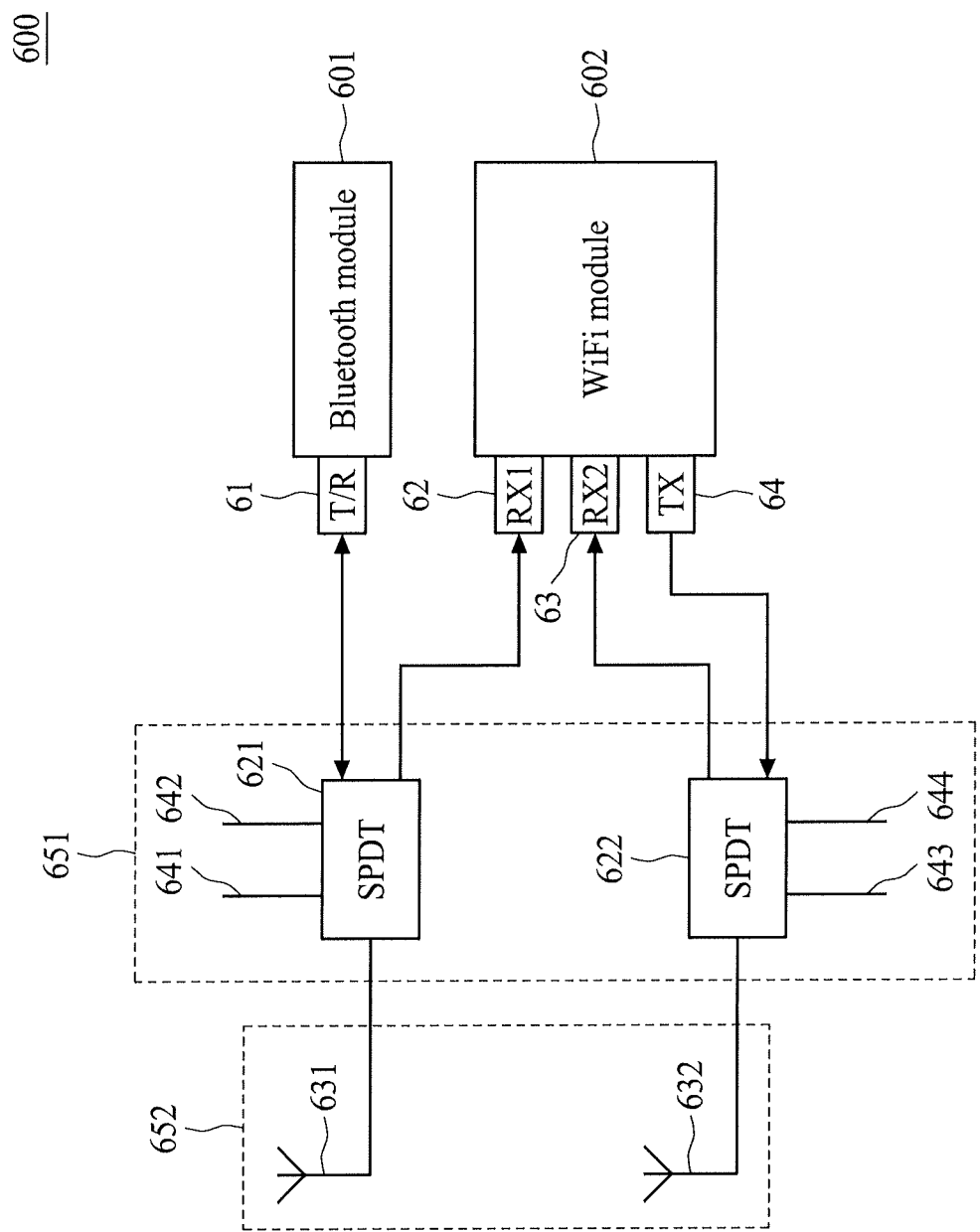
FIG. 6 shows a block diagram of a combo wireless system in accordance with another exemplary embodiment of the present disclosure.

FIG. 6 is a block diagram of a combo wireless system in accordance with another exemplary embodiment of the present disclosure. The combo wireless system 600 comprises a Bluetooth module 601, a WiFi module 602, a switch 651 and a communication antenna 652. The switch 651 comprises an SPDT switch 621 and an SPDT switch 622. The communication antenna 652 comprises an antenna 631 and an antenna 632. In accordance with an exemplary embodiment, the Bluetooth module 601 is a 1T1R module. The WiFi module 602 is a one transmission two receiving (1T2R) module. The antenna 631 is utilized to transmit/receive Bluetooth signals for the Bluetooth module 601, and to receive WiFi signals for the WiFi module 602. The antenna 632 is utilized to transmit/receive WiFi signals for the WiFi module 602. The SPDT switch 621 is coupled between the antenna 631, the Bluetooth module 601 and the WiFi module 602. The SPDT switch 622 is coupled between the antenna 632 and the WiFi module 602. The SPDT switch 621 is controlled by a control line 641 and a control line 642 to select a signal path for the Bluetooth module 601 to transmit/receive Bluetooth signals through the antenna 631, or to select another signal path for an RX1 port 62 of the WiFi module 602 to receive WiFi signals through the antenna 631. The SPDT switch 622 is controlled by a control line 643 and a control line 644 to select a signal path for the RX2 port 63 of the WiFi module 602 to receive WiFi signals through the antenna 632, or to select another path for a TX port 64 of the WiFi module 602 to transmit WiFi signals through the antenna 632. In this embodiment, either the antenna 631 or the antenna 632 can be selected for the WiFi module 602 to receive WiFi signals. During the period of receiving signals, the WiFi module 602 can achieve antenna diversity. The WiFi module 602 is used as an example, and can be replaced with other wireless modules, such as a 3G module, a WiMAX module or a UWB module. The above-mentioned WiFi signals can also be 3G signals, WiMAX signals or UWB signals.

Figure 7:
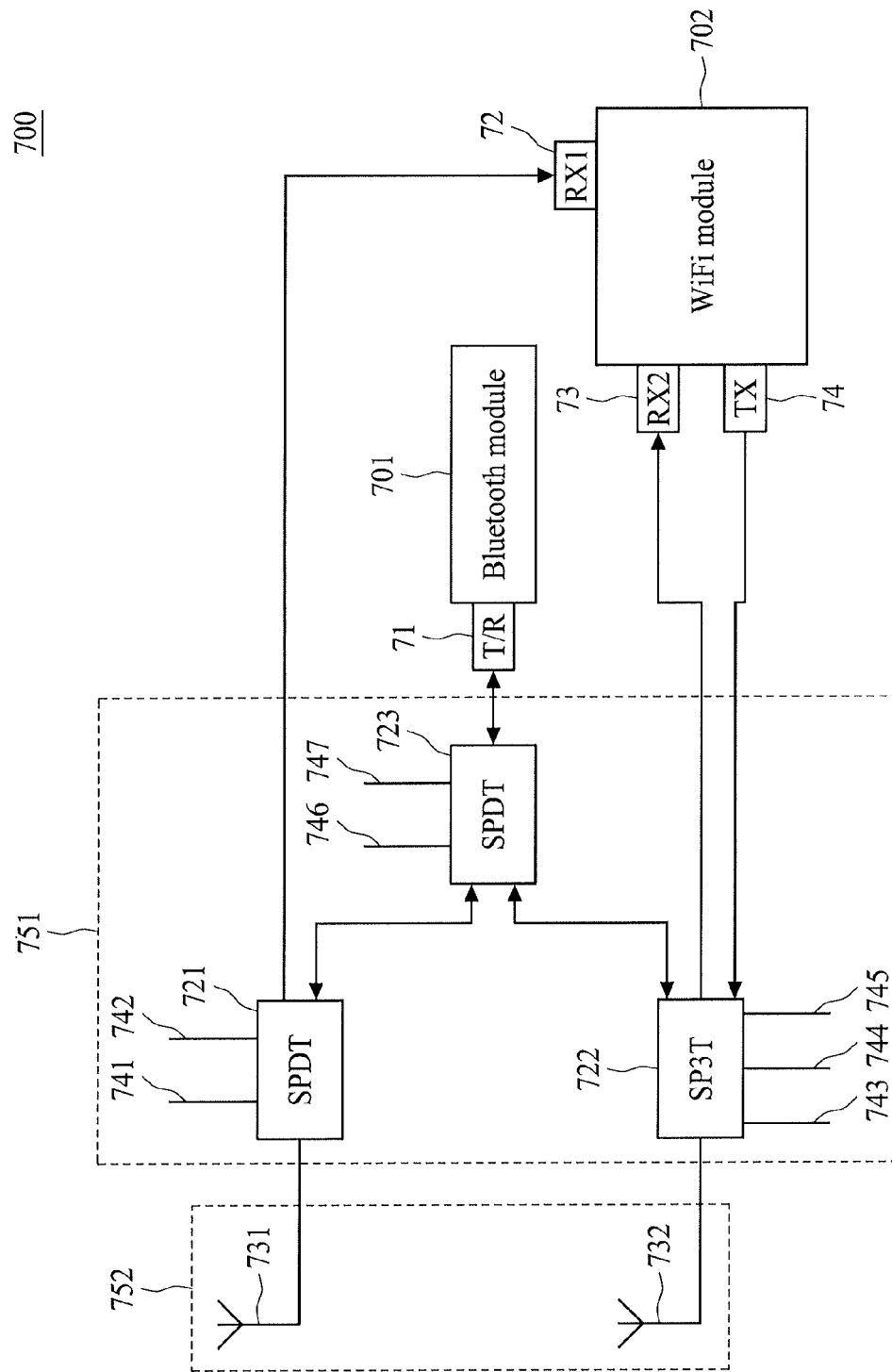
FIG. 7 shows a block diagram of a combo wireless system in accordance with another exemplary embodiment of the present disclosure.

FIG. 7 is a block diagram of a combo wireless system in accordance with another exemplary embodiment of the present disclosure. The combo wireless system 700 comprises a Bluetooth module 701, a WiFi module 702, a switch 751 and a communication antenna 752. The switch 751 comprises an SPDT switch 721, an SP3T switch 722 and an SPDT switch 723. The communication antenna comprises an antenna 731 and an antenna 732. In accordance with an exemplary embodiment, the Bluetooth module 701 is a 1T1R module. The WiFi module 702 is a 1T2R module. The antenna 731 is utilized to transmit/receive Bluetooth signals for the Bluetooth module 701, and to receive WiFi signals for the WiFi module 702. The antenna 732 is utilized to transmit/receive Bluetooth signals for the Bluetooth module 701 and to transmit/receive WiFi signals for the WiFi module 702. The SPDT switch 721 is coupled between the antenna 731, the SPDT switch 723 and the WiFi module 702. The SPDT switch 722 is coupled between the antenna 732, the SPDT switch 723 and the WiFi module 702. The SPDT switch 723 is coupled between the SPDT switch 721, the SPDT switch 722 and the Bluetooth module 701. The SPDT switch 721 is controlled by a control line 741 and a control line 742 to select a signal path for the Bluetooth module 701 to transmit/receive Bluetooth signals through the SPDT switch 723 and the antenna 731, or to select another signal path for an RX1 port 72 of the WiFi module 702 to receive WiFi signals through the antenna 731. The SP3T switch 722 is controlled by a control line 743, a control line 744 and a control line 745 to select a signal path for the Bluetooth module 701 to transmit/receive Bluetooth signals through the SPDT switch 723 and the antenna 732, to select another signal path for an RX2 port 73 of the WiFi module 702 to receive WiFi signals through the antenna 732, or to select yet another path for a TX port 74 of the WiFi module 702 to transmit WiFi signals through the antenna 732. In this embodiment, either the antenna 731 or the antenna 732 can be selected for the Bluetooth module 701 to transmit/receive Bluetooth signals and for the WiFi module 702 to receive WiFi signals. During the period of transmitting/receiving Bluetooth signals, the Bluetooth module 701 can achieve antenna diversity. During the period of receiving WiFi signal, the WiFi module 702 can achieve antenna diversity. The WiFi module 702 is used as an example, and can be replaced with other wireless modules, such as a 3G module, a WiMAX module or a UWB module. The above-mentioned WiFi signals can also be 3G signals, WiMAX signals or UWB signals.

Figure 8:
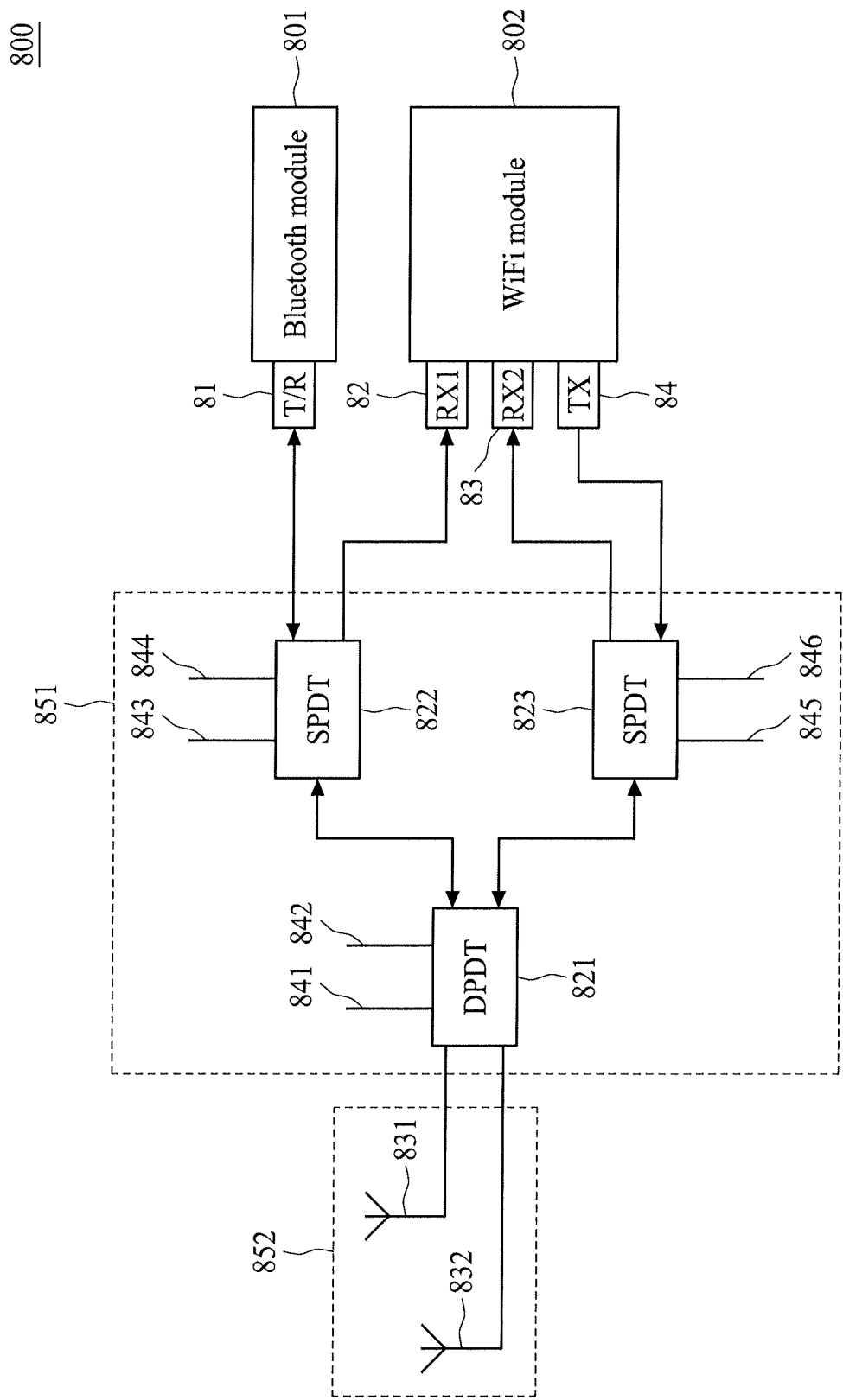
FIG. 8 shows a block diagram of a combo wireless system in accordance with another exemplary embodiment of the present disclosure.

FIG. 8 is a block diagram of a combo wireless system in accordance with another exemplary embodiment of the present disclosure. The combo wireless system 800 comprises a Bluetooth module 801, a WiFi module 802, a switch 851 and a communication antenna 852. The switch 851 comprises a DPDT switch 821, an SPDT switch 822 and an SPDT switch 823. The communication antenna 852 comprises an antenna 831 and an antenna 832. In accordance with an exemplary embodiment, the Bluetooth module 801 is a 1T1R module. The WiFi module 802 is a 1T2R module. The antenna 831 and the antenna 832 are utilized to transmit/receive Bluetooth signals for the Bluetooth module 801, and to transmit/receive WiFi signals for the WiFi module 802. The DPDT switch 821 is coupled between the antenna 831, the antenna 832, the SPDT switch 822 and the SPDT switch 823. The SPDT switch 822 is coupled between the DPDT switch 821 and the Bluetooth module 801. The SPDT switch 823 is coupled between the DPDT switch 821 and the WiFi module 802. The DPDT switch 821 is controlled by a control line 841 and a control line 842 to select a signal path for a transmitting/receiving (T/R) port 81 of the Bluetooth module 801 to transmit/receive Bluetooth signals or for an RX1 port 82 of the Wireless module 802 to receive wireless signals through the switch SPDT 822 and either the antenna 831 or the antenna 832, and to select the other signal path for the WiFi module 802 to transmit/receive WiFi signals through the SPDT switch 823 and the other antenna 831 or antenna 832, i.e., the antenna 831 or the antenna 832 which is not coupled to the SPDT 822. The SPDT switch 822 is controlled by a control line 843 and a control line 844 to select a signal path for the Bluetooth module 801 to transmit/receive Bluetooth signals through the DPDT switch 821 and the antenna 831 or the antenna 832 which is coupled to the SPDT switch 822, or to select another signal path for the RX1 port 82 of the WiFi module 802 to receive WiFi signals through the DPDT switch 821 and the antenna 831 or the antenna 832 which is coupled to the SPDT switch 822. The SPDT switch 823 is controlled by a control line 845 and a control line 846 to select a signal path for an RX2 port 83 of the WiFi module 802 to receive WiFi signals through the DPDT switch 821 and the antenna 831 or the antenna 832 which is coupled to the SPDT switch 823, or to select another path for a TX port 84 of the WiFi module 802 to transmit WiFi signals through the DPDT switch 821 and the antenna 831 or the antenna 832 which is coupled to the SPDT switch 823. During the period of receiving WiFi signal, the WiFi module 802 can achieve antenna diversity. The WiFi module 802 is used as an example, and can be replaced with other wireless modules, such as a 3G module, a WiMAX module or a UWB module. The above-mentioned WiFi signals can also be 3G signals, WiMAX signals or UWB signals.

Figure 9:
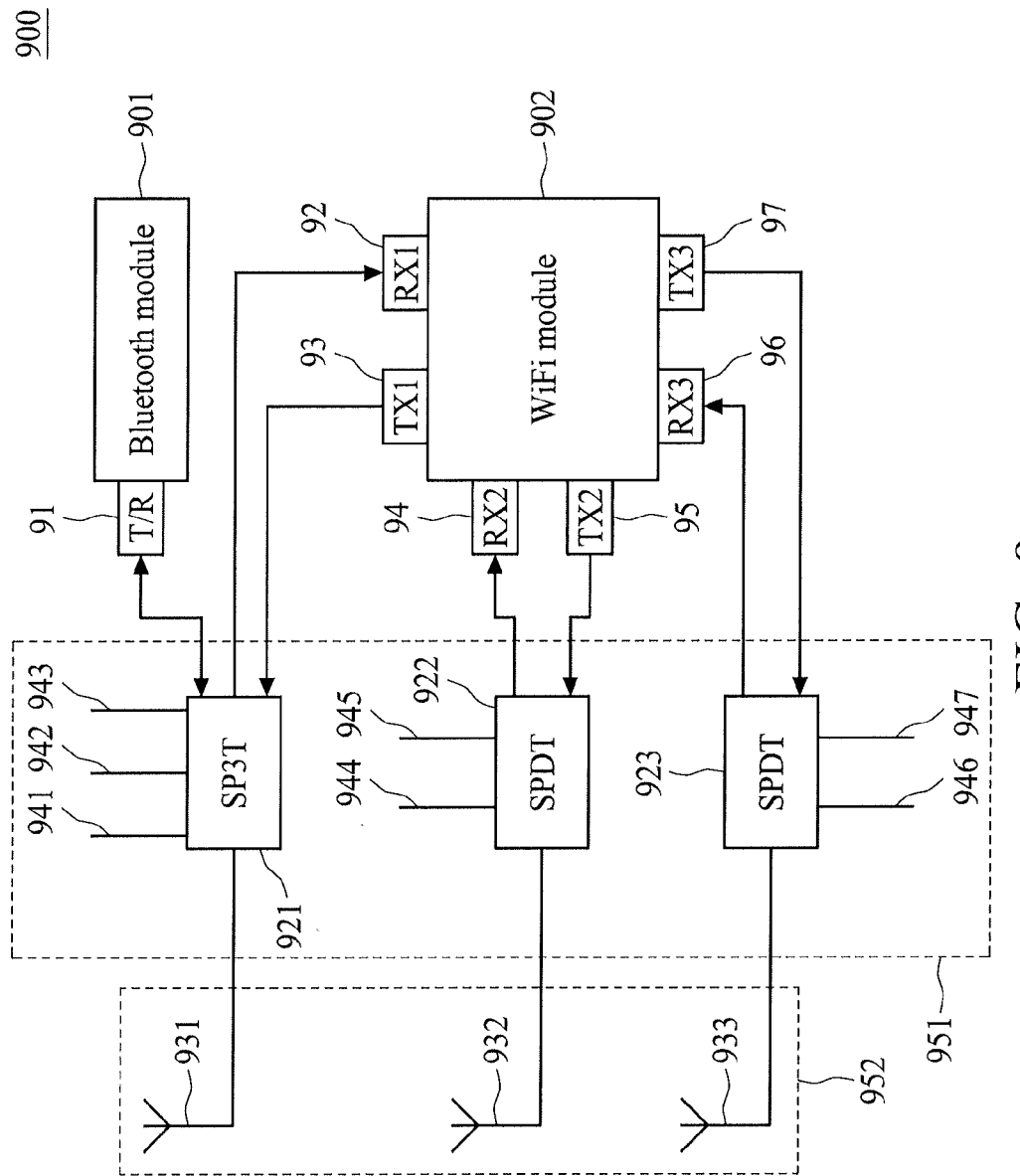
FIG. 9 shows a block diagram of a combo wireless system in accordance with another exemplary embodiment of the present disclosure.

FIG. 9 is a block diagram of a combo wireless system in accordance with another exemplary embodiment of the present disclosure. The combo wireless system 900 comprises a Bluetooth module 901, a WiFi module 902, a switch 951 and a communication antenna 952. The switch 951 comprises an SP3T switch 921, an SPDT switch 922 and an SPDT switch 923. The communication antenna 952 comprises an antenna 931, an antenna 932 and an antenna 933. In accordance with an exemplary embodiment, the Bluetooth module 901 is a 1T1R module. The WiFi module 902 is a three transmission three receiving (3T3R) module. The antenna 931 is utilized to transmit/receive Bluetooth signals for the Bluetooth module 901, and to transmit/receive WiFi signals for the WiFi module 902. The antenna 932 is utilized to transmit/receive WiFi signals for the WiFi module 902. The antenna 933 is utilized to transmit/receive WiFi signals for the WiFi module 902. The SP3T switch 921 is coupled between the antenna 931, the Bluetooth module 901 and the WiFi module 902. The SPDT switch 922 is coupled between the antenna 932 and the WiFi module 902. The SPDT switch 923 is coupled between the antenna 933 and the WiFi module 902. The SP3T switch 921 is controlled by a control line 941, a control line 942 and a control line 943 to select a signal path for the Bluetooth module 901 to transmit/receive Bluetooth signals through the antenna 931, to select another signal path for an RX1 port 92 of the WiFi module 902 to receive WiFi signals through the antenna 931, or to select yet another path for a TX1 port 93 of the WiFi module 902 to transmit WiFi signals through the antenna 931. The SPDT switch 922 is controlled by a control line 944 and a control line 945 to select a signal path for an RX2 port 94 of the WiFi module 902 to receive WiFi signals through the antenna 932, or to select another path for a TX2 port 95 of the WiFi module 902 to transmit WiFi signals through the antenna 932. The SPDT switch 923 is controlled by a control line 946 and a control line 947 to select a signal path for an RX3 port 96 of the WiFi module 902 to receive WiFi signals through the antenna 933, or to select another path for a TX3 port 97 of the WiFi module 902 to transmit WiFi signals through the antenna 933. The WiFi module 902 is used as an example, and can be replaced with other wireless modules, such as a 3G module, a WiMAX module or a UWB module. The above-mentioned WiFi signals can also be 3G signals, WiMAX signals or UWB signals. Please note that the connections between the switches and the wireless modules are not limited to the above embodiment and can be changed.

Figure 10:
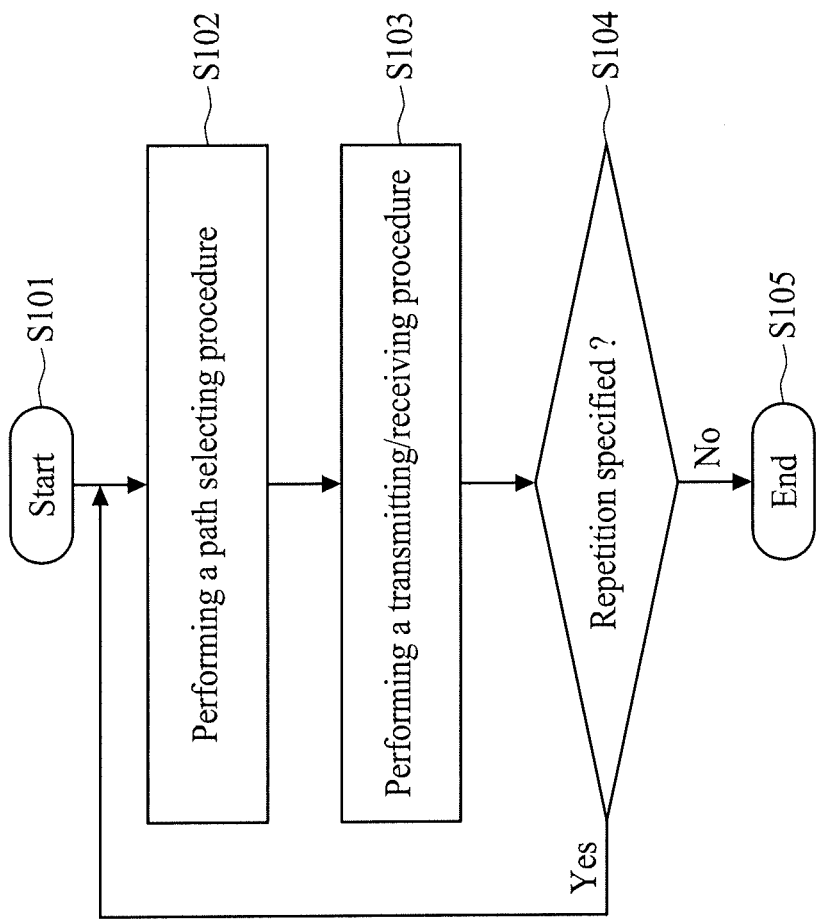
FIG. 10 shows a flowchart of a method for using a combo wireless system in accordance with another exemplary embodiment of the present disclosure.

FIG. 10 shows a flowchart of a method for using a combo wireless system in accordance with another exemplary embodiment of the present disclosure. In step S101, the procedure of the embodiment is activated. In step S102, a path selecting procedure is performed for a Bluetooth module to transmit/receive Bluetooth signals or for a WiFi module to transmit/receive WiFi signals. In step S103, a transmitting/receiving procedure is performed for the Bluetooth module to transmit/receive the Bluetooth signals or for the WiFi module to transmit/receive the WiFi signals. In step S104, it is determined whether steps 902-903 are going to be repeated. If the answer is no, the procedure ends in step S105.

In accordance with another exemplary embodiment, the path selecting procedure in step S102 is a step of: controlling a SP3T switch to select a first path for the Bluetooth module to transmit/receive the Bluetooth signals through a communication antenna, to select a second path for the WiFi module to transmit the WiFi signals through a communication antenna or to select a third path for the WiFi module to receive the WiFi signals through the communication antenna. The transmitting/receiving procedure in step S103 is a step of: transmitting/receiving the Bluetooth signals through the communication antenna; or transmitting/receiving the WiFi signals through the communication antenna.

In accordance with another exemplary embodiment, the path selecting procedure in step S102 is a step of: controlling a DPDT switch to select a first path for the Bluetooth module to transmit/receive the Bluetooth signals through a first antenna of a communication antenna and to select a second path for the WiFi module to transmit/receive the WiFi signals through a SPDT switch and through a second antenna of the communication antenna; and controlling the SPDT switch to select a third path for the WiFi module to transmit the WiFi signals through the DPDT switch and through the second antenna of the communication antenna or to select a fourth path for the WiFi module to receive the WiFi signals through the DPDT switch and through the second antenna of the communication antenna. The transmitting/receiving procedure in step S103 is a step of: transmitting/receiving the Bluetooth signals through the first antenna; or transmitting/receiving the WiFi signals through the second antenna.

In accordance with another exemplary embodiment, the path selecting procedure in step S102 is a step of: controlling a SPDT switch to select a first path for the Bluetooth module to transmit/receive the Bluetooth signals through a communication antenna or to select a second path for the WiFi module to transmit/receive the WiFi signals through a second SPDT switch and the communication antenna; or controlling the second SPDT to select a third path for the WiFi module to transmit the WiFi signals through the first SPDT switch and the communication antenna or to select a fourth path for the WiFi module to receive the WiFi signals through the first SPDT switch and the communication antenna. The transmitting/receiving procedure in step S103 is a step of: transmitting/receiving the Bluetooth signals through the communication antenna; or transmitting/receiving the WiFi signals through and the communication antenna.

In accordance with another exemplary embodiment, the path selecting procedure in step S102 is a step of: controlling a SPDT switch to select a first path for a receiving port of the WiFi module to receive the WiFi signals through a first antenna of a communication antenna or to select a second path for the receiving port of the WiFi module to receive the WiFi signals through a second SPDT switch and a second antenna of the communication antenna; or controlling the second SPDT switch to select a third path for the receiving port of the WiFi module to receive the WiFi signals through the first SPDT switch and the second antenna or to select a fourth path for a transmitting port of the WiFi module to transmit the WiFi signals through the second antenna. The transmitting/receiving procedure in step S103 is a step of: transmitting/receiving the Bluetooth signals through the first antenna; receiving the WiFi signals through the first antenna; receiving the WiFi signals through the second antenna; or transmitting the WiFi signals through the second antenna.

In accordance with another exemplary embodiment, the path selecting procedure in step S102 is a step of: controlling a first SPDT switch to select a first path for the Bluetooth module to transmit/receive the Bluetooth signals through a first antenna of a communication antenna or to select a second path for a receiving port of the WiFi module to receive the WiFi signals through the first antenna; or controlling a second SPDT switch to select a third path for the receiving port of the WiFi module to receive the WiFi signals through a second antenna of the communication antenna or to select a fourth path for a transmitting port of the WiFi module to transmit the WiFi signals through the second antenna. The transmitting/receiving procedure in step S103 is a step of: transmitting/receiving the Bluetooth signals through the first antenna; receiving the WiFi signals through the first antenna; receiving the WiFi signals through the second antenna; or transmitting the WiFi signals through the second antenna.

In accordance with another exemplary embodiment, the path selecting procedure in step S102 is a step of: controlling a first SPDT switch to select a first path for the Bluetooth module to transmit/receive the Bluetooth signals through a first antenna of a communication antenna or to select a second path for a first receiving port of the WiFi module to receive the WiFi signals through the first antenna; or controlling a second SPDT switch to select a third path for a second receiving port of the WiFi module to receive the WiFi signals through a second antenna of the communication antenna or to select a fourth path for a transmitting port of the WiFi module to transmit the WiFi signals through the second antenna. The transmitting/receiving procedure in step S103 is a step of: transmitting/receiving the Bluetooth signals through the first antenna; receiving the WiFi signals through the first antenna; receiving the WiFi signals through the second antenna; or transmitting the WiFi signals through the second antenna.

In accordance with another exemplary embodiment, the path selecting procedure in step S102 is a step of: controlling a first SPDT switch to select a first path for a first receiving port of the WiFi module to receive the WiFi signals through a first antenna of a communication antenna or select a second path for the Bluetooth module to transmit/receive the Bluetooth signals through a second SPDT switch and the first antenna; controlling a SP3T switch to select a third path for the Bluetooth module to transmit/receive the Bluetooth signals through the second SPDT switch and a second antenna of the communication antenna, to select a fourth path for a second receiving port of the WiFi module to receive the WiFi signals through the second antenna or to select a fifth path for a transmitting port of the WiFi module to transmit the WiFi signals through the second antenna; or controlling the second SPDT switch to select a sixth path for the Bluetooth module to transmit/receive the Bluetooth signals through the first SPDT switch and the first antenna or to select a seventh path for the Bluetooth module to transmit/receive the Bluetooth signals through the SP3T switch and the second antenna. The transmitting/receiving procedure in step S103 is a step of: receiving the WiFi signals through the first antenna; transmitting/receiving the Bluetooth signals through the first antenna; transmitting/receiving the Bluetooth signals through the second antenna; or receiving the WiFi signals through the first antenna; transmitting the WiFi signals through the second antenna.

In accordance with another exemplary embodiment, the path selecting procedure in step S102 is a step of: controlling a DPDT switch to select a first path for the Bluetooth module to transmit/receive the Bluetooth signals through a first antenna of a communication antenna, to select a second path for a first receiving port of the WiFi module to receive the WiFi signals through a first SPDT switch and through the first antenna of the communication antenna, to select a third path for a second receiving port of the WiFi module to receive the WiFi signals through a second SPDT switch and through a second antenna of the communication antenna, or to select a fourth path for the WiFi module to transmit the WiFi signals through the second SPDT switch and through the second antenna of the communication antenna; controlling the first SPDT switch to select a fifth path for the Bluetooth module to transmit/receive the Bluetooth signals through the DPDT switch and through the first antenna of the communication antenna or to select a sixth path for the first receiving port of the WiFi module to receive the WiFi signals through the DPDT switch and through the first antenna of the communication antenna; or controlling the second SPDT switch to select a seventh path for the second receiving port of the WiFi module to receive the WiFi signals through the DPDT switch and through the second antenna of the communication antenna or to select a eighth path for the WiFi module to transmit the WiFi signals through the DPDT switch and through the second antenna of the communication antenna. The transmitting/receiving procedure in step S103 is a step of: transmitting/receiving the Bluetooth signals through the first antenna; receiving the WiFi signals through the first antenna; receiving the WiFi signals through the second antenna; transmitting the WiFi signals through the second antenna.

In accordance with another exemplary embodiment, the path selecting procedure in step S102 is a step of: controlling a SP3T switch to select a first path for the Bluetooth module to transmit/receive the Bluetooth signals through a first antenna of a communication antenna, to select a second path for a first receiving port of the WiFi module to receive the WiFi signals through the first antenna or to select a third path for a first transmitting port of the WiFi module to transmit the WiFi signals through the first antenna; controlling a first SPDT switch to select a fourth path for a second receiving port of the WiFi module to receive the WiFi signals through a second antenna of the communication antenna or to select a fifth path for a second transmitting port of the WiFi module to transmit the WiFi signals through the second antenna; or controlling a second SPDT switch to select a sixth path for a third receiving port of the WiFi module to receive the WiFi signals through a third antenna of the communication antenna or to select a seventh path for a third transmitting port of the WiFi module to transmit the WiFi signals through the third antenna. The transmitting/receiving procedure in step S103 is a step of: transmitting/receiving the Bluetooth signals through the first antenna; receiving the WiFi signals through the first antenna; transmitting the WiFi signals through the first antenna; receiving the WiFi signals through the second antenna; transmitting the WiFi signals through the second antenna; receiving the WiFi signals through the third antenna; or transmitting the WiFi signals through the third antenna.

The above-mentioned WiFi modules is used as an example, and can be replaced with other wireless modules, such as 3G modules, WiMAX modules or UWB modules. The above-mentioned WiFi signals can also be 3G signals, WiMAX signals or UWB signals.

The above-described embodiments of the present invention are intended to be illustrative only. Numerous alternative embodiments may be devised by persons skilled in the art without departing from the scope of the following claims.

What is claimed is:

1. A combo wireless system, comprising:
at least one communication antenna configured to transmit/receive a first type of signal for a first wireless module and to transmit/receive a second type of signal for a second wireless module, the at least one communication antenna including a first antenna and a second antenna; and
at least one switch coupled between the at least one communication antenna, the first wireless module and the second wireless module;
wherein the at least one switch comprises:
a first single pole dual throw (SPDT) switch disposed between the first antenna, the second antenna and a receiving port of the second wireless module; and
a second SPDT switch coupled between the second antenna, the first SPDT switch and a transmitting port of the second wireless module, wherein the first SPDT switch is controlled to select a first path for the receiving port of the second wireless module to receive the second type of signal through the first antenna or to select a second path for the receiving port of the second wireless module to receive the second type of signal through the second SPDT switch and the second antenna, and the second SPDT switch is controlled to select a third path for the receiving port of the second wireless module to receive the second type of signal through the first SPDT switch and the second antenna or to select a fourth path for the transmitting port of the second wireless module to transmit the second type of signal through the second antenna,
wherein the first wireless module comprises a transmit/receive port coupled to the first antenna.

2. A combo wireless system, comprising,
at least one communication antenna configured to transmit/receive a first type of signal for a first wireless module and to transmit/receive a second type of signal for a second wireless module, the at least on communication antenna including a first antenna and a second antenna; and
at least one switch coupled between the at least one communication antenna, the first wireless module and the second wireless module;
wherein the at least one switch comprises:
a first single pole dual throw (SPDT) switch coupled between the first antenna, a transmit/receive port of the first wireless module and a receiving port of the second wireless module; and
a second SPDT switch coupled between the second antenna, the receiving port of the second wireless module and a transmitting port of the second wireless module, wherein the first SPDT switch is controlled to select a first path for the first wireless module to transmit/receive the first type of signal through the first antenna or to select a second path for the receiving port of the second wireless module to receive the second type of signal through the first antenna, and the second SPDT switch is controlled to select a third path for the receiving port of the second wireless module to receive the second type of signal through the second antenna or to select a fourth path for the transmitting port of the second wireless module to transmit the second type of signal through the second antenna.

3. The combo wireless system of claim 2, wherein the receiving port of the second wireless module comprises:
a first sub receiving port; and
a second sub receiving port,
wherein the first SPDT switch is controlled to select the second path for the first sub receiving port of the receiving port of the second wireless module to receive the second type of signal through the first antenna, and the second SPDT switch is controlled to select the third path for the second sub receiving port of the receiving port of the second wireless module to receive the second type of signal through the second antenna.

4. A combo wireless system, comprising:
at least one communication antenna configured to transmit/receive a first type of signal for a first wireless module and to transmit/receive a second type of signal for a second wireless module; and
at least one switch coupled between the at least one communication antenna, the first wireless module and the second wireless module;
wherein the at least one communication antenna comprises:
a first antenna configured to transmit/receive the first type of signal for the first wireless module and to receive the second type of signal for the second wireless module; and
a second antenna configured to transmit/receive the first type of signal for the first wireless module and to transmit/receive the second type of signal for the second wireless module,
wherein the at least one switch comprises:
a first single pole dual throw (SPDT) switch disposed between the first antenna, the first wireless module and a first receiving port of the second wireless module;
a single pole triple throw (SP3T) switch disposed between the second antenna, the first wireless module, a second receiving port of the second wireless module and a transmitting port of the second wireless module; and
a second SPDT switch coupled between the first SPDT switch, the SP3T switch and the first wireless module, wherein the first SPDT switch is controlled to select a first path for the first receiving port of the second wireless module to receive the second type of signal through the first antenna or select a second path for the first wireless module to transmit/receive the first type of signal through the second SPDT switch and the first antenna, the SP3T switch is controlled to select a third path for the first wireless module to transmit/ receive the first type of signal through the second SPDT switch and the second antenna, to select a fourth path for the second receiving port of the second wireless module to receive the second type of signal through the second antenna or to select a fifth path for the transmitting port of the second wireless module to transmit the second type of signal through the second antenna, and the second SPDT switch is controlled to select a sixth path for the first wireless module to transmit/receive the first type of signal through the first SPDT switch and the first antenna or to select a seventh path for the first wireless module to transmit/receive the first type of signal through the SP3T switch and the second antenna.

5. A combo wireless system, comprising:

at least one communication antenna configured to transmit/receive a first type of signal for a first wireless module and to transmit/receive a second type of signal for a second wireless module, the at least one communication antenna including two sub-antennas; and at least one switch coupled between the at least one communication antenna, the first wireless module and the second wireless module;

wherein the at least one switch comprises:

a dual pole dual throw (DPDT) switch disposed between the two sub-antennas, the first wireless module and the second wireless module;

a first single pole dual throw (SPDT) switch coupled between the DPDT switch, the first wireless module and the second wireless module, wherein the first SPDT switch is controlled to select a first path for the first wireless module to transmit/receive the first type of signal through the DPDT switch and through one of the two sub-antennas and to select a second path for the second wireless module to receive the second type of signal through the DPDT switch and through the other one of the two sub-antennas; and a second SPDT switch coupled between the DPDT switch and the second wireless module, wherein the second SPDT switch is controlled to select a third path for the second wireless module to transmit the first type of signal through the DPDT and through one of the two sub-antennas and to select a fourth path for the second wireless module to receive the second type of signal through the DPDT and through one of the two sub-antennas.

6. A combo wireless system, comprising:

at least one communication antenna configured to transmit/receive a first type of signal for a first wireless module and to transmit/receive a second type of signal for a second wireless module; and at least one switch coupled between the at least one communication antenna, the first wireless module and the second wireless module;

wherein the at least one communication antenna comprises:

a first antenna configured to transmit/receive the first type of signal for the first wireless module and to transmit/receive the second type of signal for the second wireless module;

a second antenna configured to transmit/receive the second type of signal for the second wireless module; and a third antenna configured to transmit/receive the second type of signal for the second wireless module;

wherein the at least one switch includes:

a single pole triple throw (SP3T) switch coupled between the first antenna, the first wireless module, a first receiving port of the second wireless module and a first transmitting port of the second wireless module;

a first single pole dual throw (SPDT) switch coupled between the second antenna, a second receiving port of the second wireless module and a second transmitting port of the second wireless module; and a second SPDT switch coupled between the third antenna, a third receiving port of the second wireless module and a third transmitting port of the second wireless module, wherein the SP3T switch is controlled to select a first path for the first wireless module to transmit/receive the first type of signal through the first antenna, to select a second path for the first receiving port of the second wireless module to receive the second type of signal through the first antenna or to select a third path for the first transmitting port of the second wireless module to transmit the second type of signal through the first antenna, the first SPDT switch is controlled to select a fourth path for the second receiving port of the second wireless module to receive the second type of signal through the second antenna or to select a fifth path for the second transmitting port of the second wireless module to transmit the second type of signal through the second antenna, and the second SPDT switch is controlled to select a sixth path for the third receiving port of the second wireless module to receive the second type of signal through the third antenna or to select a seventh path for the third transmitting port of the second wireless module to transmit the second type of signal through the third antenna.

\* \* \* \* \*